(12) United States Patent
Gerber

(10) Patent No.: US 8,776,818 B2
(45) Date of Patent: Jul. 15, 2014

(54) ELECTRONIC COOLANT VALVE WITH FLEXIBLE SEAL

(75) Inventor: Vaughn Gerber, Portage, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/820,143

(22) PCT Filed: Aug. 29, 2011

(86) PCT No.: PCT/US2011/049529
§ 371 (c)(1),
(2), (4) Date: Feb. 28, 2013

(87) PCT Pub. No.: WO2012/030708
PCT Pub. Date: Mar. 8, 2012

(65) Prior Publication Data
US 2013/0160861 A1 Jun. 27, 2013

Related U.S. Application Data

(60) Provisional application No. 61/378,912, filed on Aug. 31, 2010.

(51) Int. Cl.
*F16K 31/04* (2006.01)

(52) U.S. Cl.
USPC .................. 137/1; 251/129.11; 251/264

(58) Field of Classification Search
USPC ............ 251/129.11, 189, 191, 264; 137/1
See application file for complete search history.

(56) References Cited

U.S. PATENT DOCUMENTS

| 2,213,680 | A | * | 9/1940 | Share | 251/190 |
| 2,552,991 | A | * | 5/1951 | McWhorter | 251/189 |
| 3,095,904 | A | * | 7/1963 | Thaning | 251/191 |
| 3,468,339 | A | * | 9/1969 | Gray | 251/191 |
| 3,768,514 | A | * | 10/1973 | Goto | 251/191 |
| 3,990,677 | A | * | 11/1976 | Grenier | 251/189 |
| 5,118,079 | A | * | 6/1992 | Watts | 251/191 |
| 7,191,793 | B2 | * | 3/2007 | Maula et al. | 251/331 |
| 2005/0092308 | A1 | * | 5/2005 | Tsokonas | 251/129.11 |

* cited by examiner

*Primary Examiner* — John Bastianelli

(57) ABSTRACT

An electronic coolant valve with a flexible sealing membrane. The membrane is expanded or contracted radially via a drive screw and an electric motor. The extension and retraction of the drive screw changes the shape of the membrane in the flow passage. The membrane can be adjusted to allow full passage of coolant through a passageway, to completely block off (close) the flow channel preventing fluid from flowing through it, or to allow a restricted or metered amount of coolant to pass through the passageway.

7 Claims, 4 Drawing Sheets

ELECTRONIC COOLANT VALVE WITH FLEXIBLE SEAL

CROSS REFERENCE TO RELATED APPLICATIONS

This application claims priority from U.S. Application Ser. No. 61/378,912, filed on Aug. 31, 2010.

TECHNICAL FIELD

The present invention pertains to an electronic coolant valve with a flexible sealing membrane.

BACKGROUND

Although there have been many changes and improvements in vehicle cooling systems for internal combustion engines over the last few decades, the wax pill actuated coolant valve (thermostat) has remained basically unchanged since its inception. With the increase in government mandated fuel economy regulations, companies are increasingly looking for new technology that will reduce the parasitic losses and improve efficiency of internal combustion engines. Furthermore, the introduction of hybrid and full electric vehicle powertrains has introduced new powertrain coolant and thermal management complexities due to the need to control the temperature of batteries, inverter electronics, eMotors, etc. These trends lead to the need for more intelligently controlled coolant valves.

Some thermostat valve manufacturers have introduced a heated wax design in which a heating element is used to expand the wax to open the valve. This provides a direct electric actuation mechanism, but does not provide for precise control. Other valve manufacturers have prototype designs which use a brushless DC (BLDC) motor and gear train for actuating the valves. There also is a controlled coolant valve design that employs a rotary design actuated by a BLDC gearmotor.

SUMMARY OF THE INVENTION

The present invention comprises an electronic coolant valve which selectively allows various amounts of coolant, or no coolant, to flow through a passageway. The invention is an improvement over known thermostats and uses a stepper or brushless motor with an integrated lead (drive) screw and a flexible sealing membrane actuated by the lead screw. In a preferred embodiment of the invention, a motor and lead screw is utilized to transfer rotary motion into a threaded nut member. The threaded nut member transforms the rotary motion into linear motion which expands or retracts a flexible sealing membrane. Anti-rotation members can be provided to prevent rotation of the nut member and sealing membrane.

The act of expanding a flexible sealing membrane forces out the mid-section of the membrane allowing it to contact the sides of a manifold passageway and block off and prevent coolant flow. Conversely, retracting the flexible sealing membrane contracts and extends it, allowing coolant to freely pass through the passageway. Infinite control of the flow of fluid through the passageway exists between the totally open and totally closed conditions.

In another embodiment of the invention, the drive screw could be rotated by the motor and translate in a longitudinal manner. The flexible membrane is attached to the end of the drive screw but does not rotate with the drive screw. The longitudinal movement of the drive screw either expands the membrane or extends it, depending on the direction of movement of the drive screw.

In other embodiments of the invention, the flexible sealing membrane that expands and contracts can incorporate features that assist in controlling the flexible nature of the membrane. The features include changing the thickness of the membrane at various places and adding circumferential grooves at certain locations. The membrane may also have a uniform thickness throughout its length.

The flexible sealing membrane also can seal the mechanical interfaces from the coolant. This insures the mechanical actuators stay free of coolant, sludge and system contamination.

Further objects, features and benefits of the invention will become apparent to persons skilled in the art from the following description of the preferred embodiments when also viewed in accordance with the attached drawings and appended claims.

DESCRIPTION OF THE PREFERRED EMBODIMENTS

Figure 1:
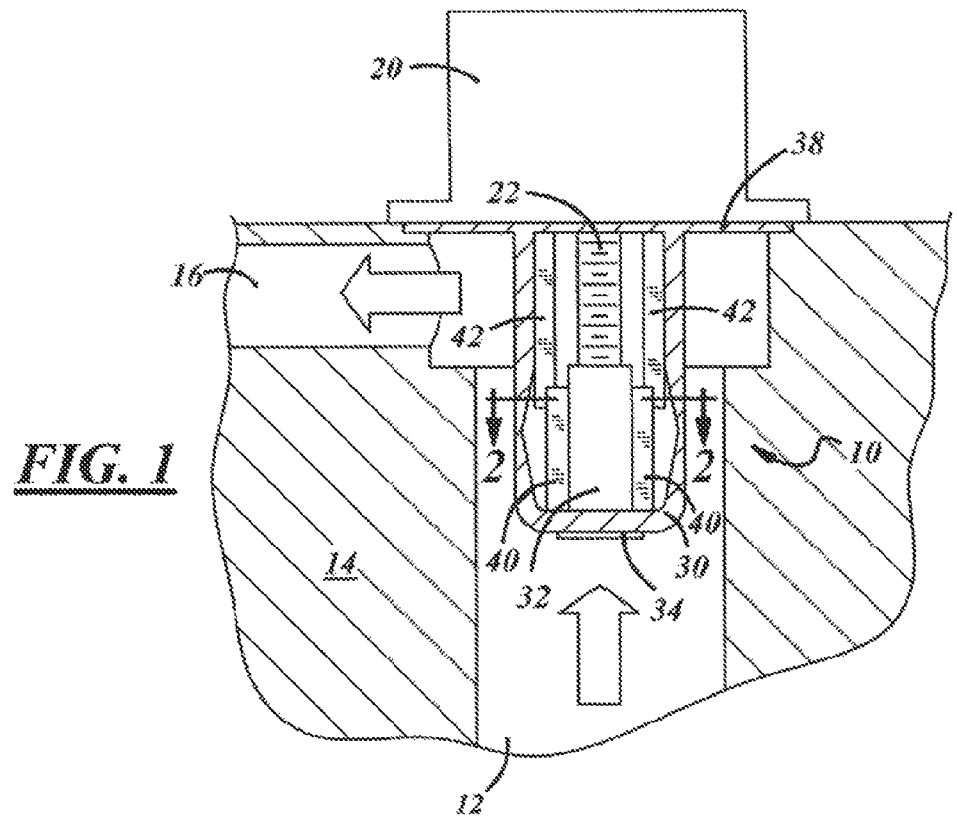
FIG. 1 schematically illustrates an embodiment of the present invention.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons of ordinary skill in the art to which the invention relates.

Figure 2:
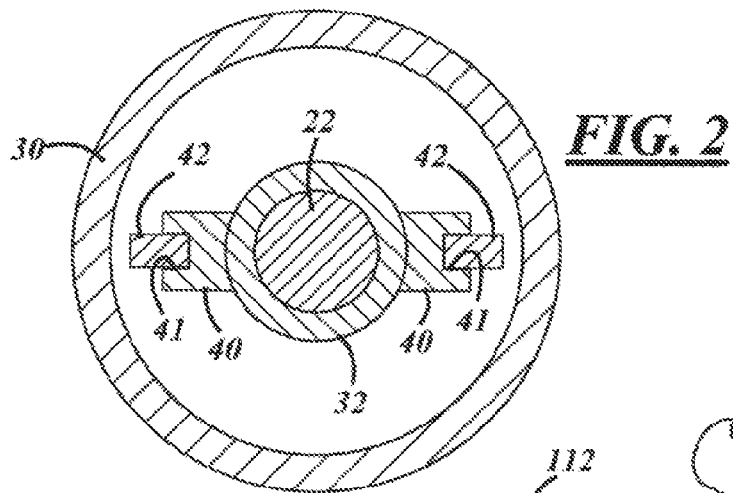
FIG. 2 is a cross-section taken along line 2-2 in FIG. 1.

An embodiment of the present invention is shown schematically in FIG. 1 and referred to generally by the reference numeral 10. FIG. 2 is a cross-section taken along lines 2-2 in FIG. 1. As shown in FIG. 1, the electronic coolant valve 10 is positioned in an inlet channel or passageway 12 of a manifold 14 or similar mechanism. The electronic coolant valve 10 is adapted to either prohibit, meter, or open the passageway 12 relative to the flow of coolant through the passageway to the outlet channel 16.

The electronic coolant valve has an actuator member 20 that rotates and drives a threaded lead screw 22. The lead screw can also be called a drive screw. A threaded sleeve member 32 is positioned on the end of the lead screw 22 and secured to a flexible membrane 30 by a fastener 34, such as a rivet. Rotation of the drive screw 22 moves the sleeve member 32 in a longitudinal direction which in turn radially expands or contracts the flexible member 30.

The actuator member can be any type of electric motor with the ability to transfer rotary motion into rotational movement of the lead screw 22. For example, the actuator can be a stepper motor or a brushless DC (BLDC) motor. The flexible membrane 30 can be of any type of real or synthetic rubber or elastomer material, such as silicone, but preferably is made of ethylene propylene diene monomer (EPDM).

The actuation of the electric motor 20 rotates the lead screw to extend or retract the membrane 30 radially in the inlet channel or passageway 12. If the lead screw is rotated in one direction, the flexible membrane expands radially outwardly toward the walls of the flow channel. Similarly, when the electronic motor rotates the lead screw in the opposite direction, the membrane 30 is stretched (i.e. pulled in radially toward the lead screw), opening the passageway to allow flow of the coolant material into the outlet channel 16.

To prevent rotation of the threaded sleeve member 32 as the lead screw 22 rotates, anti-rotation guide members 40 and 42 are provided. Guide members 40 are generally "U" shaped members having a longitudinal groove or channel 41. The guide members 40 are affixed to the sleeve member 32. Guide members 42 are elongated slat-type members which are fixedly secured to retainer member 38 at one end, and positioned in channels 41 at the other end. As the lead screw 22 rotates, the guide members 42 slide longitudinally in guide members 40 and prevent rotation of the sleeve member 32 and the flexible membrane 30.

Although a pair of mating guide members 40 and 42 are present in the embodiment depicted in the Figures, there can be any number of guide members provided, such as 3, 4, 5, etc. Regardless of the number of mating guide members provided, they preferably are spread uniformly around the circumference of the sleeve member 32 in order to allow the mechanism to operate more easily and uniformly.

In another embodiment of the invention, the drive screw can be moved longitudinally by rotation of the motor 20, such as by a worm gear. In this embodiment, the flexible membrane is attached to the distal end of the drive screw with a rotational mechanism which allows rotation of the drive screw, but prevents rotation of the flexible membrane. A threaded sleeve member and anti-rotational guides are not necessary. Thus, as the drive screw moves longitudinally in one direction, the flexible membrane expands radially outwardly. As the drive screw moves longitudinally in the other direction, the flexible membrane is retracted radially inwardly.

The sealing member which preferably is a flexible membrane, can have a uniform thickness throughout, or the thickness can be modified in certain locations to assist in better operation of the invention. Some of the various thickness embodiments that are possible are shown in the drawings.

It is also possible to provide one or more external circumferential grooves in the membrane as shown in FIGS. 3-5 and 7. The grooves assist in controlling the direction and amount of contraction and expansion of the membrane. Other embodiments can have a series of grooves either circumferentially or longitudinally for the same purpose. The area of thinner cross-section and circumferential grooves can provide hinge-points to allow ease of expansion of the flexible member.

The sealing membrane also helps seal the actuator member from the coolant or liquid flow. In this regard, it is preferred that the membrane contact and seal against the motor mount or retainer members 38, 64. This is shown in FIGS. 1, 2-4, and 6.

Figure 3:
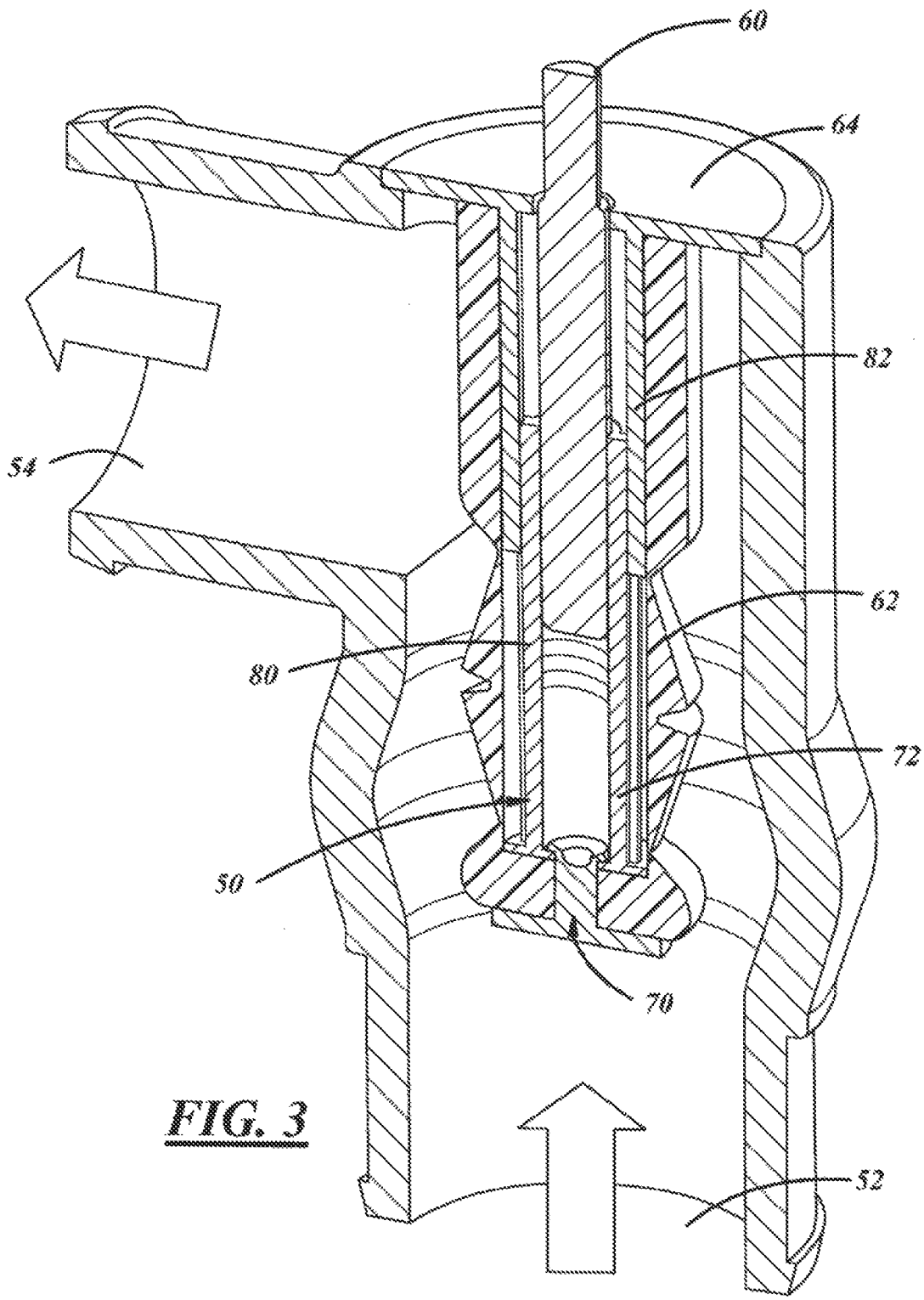
FIG. 3 illustrates an embodiment of an electric coolant valve with a flexible seal in accordance with an embodiment of the present invention, the valve being in an open state.
Figure 5:
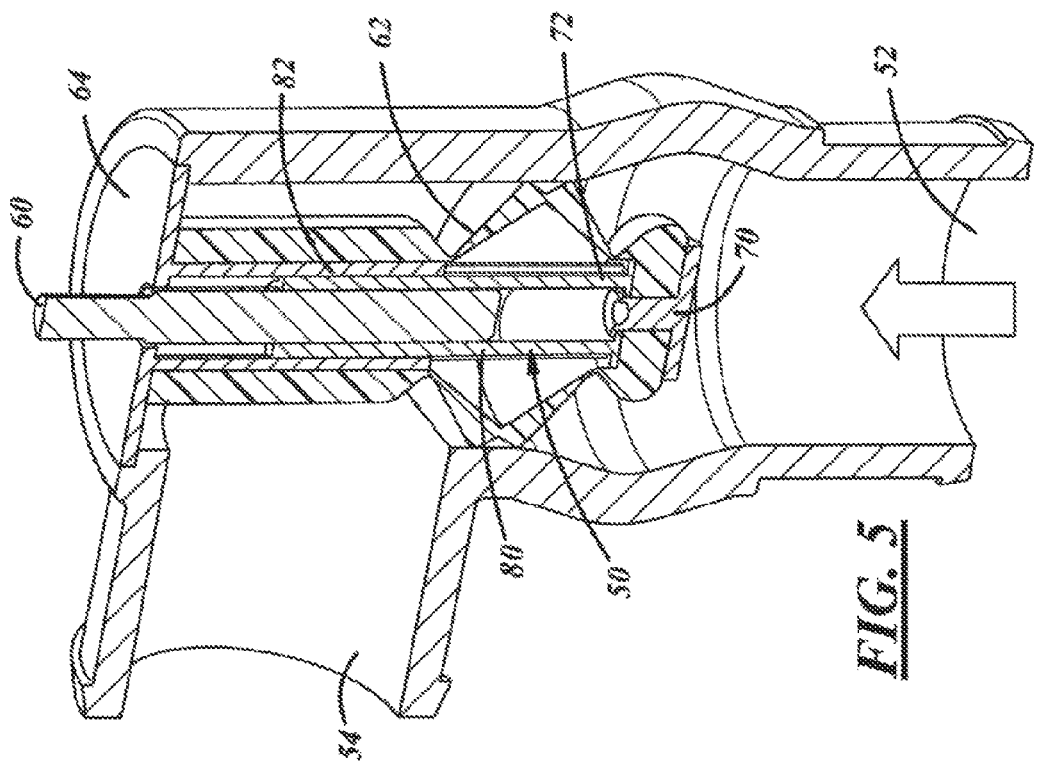
FIG. 5 illustrates the electronic cooling valve as set forth in FIG. 3 in a closed state.
Figure 4:
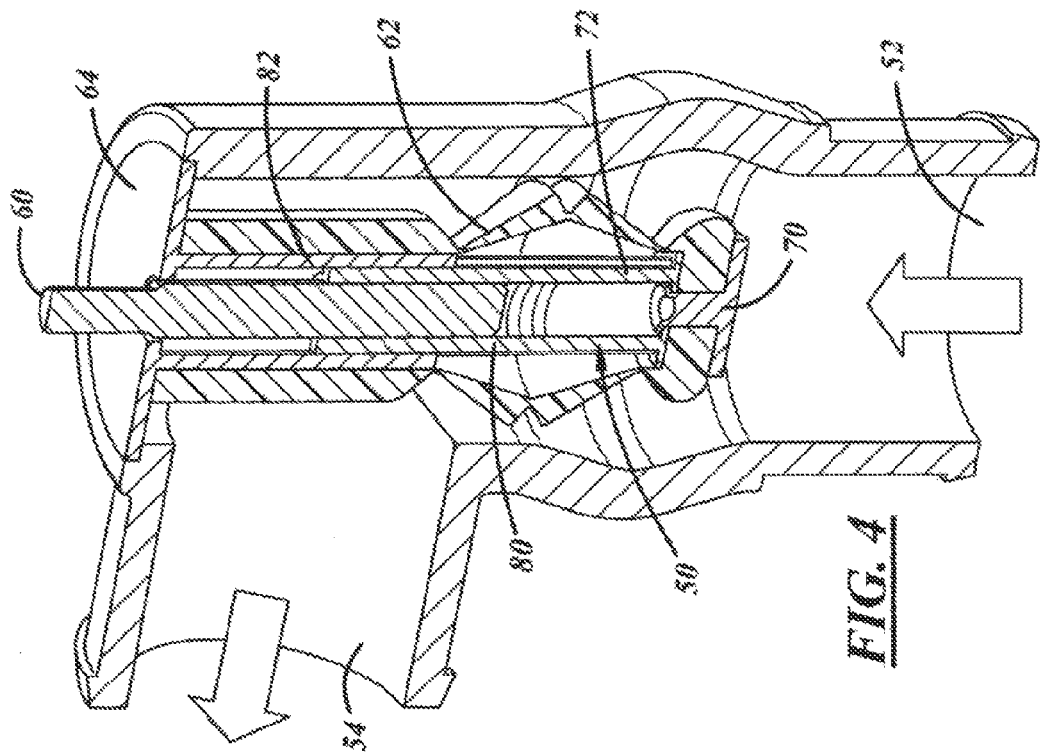
FIG. 4 illustrates the electronic coolant valve as shown in FIG. 3 in a metered state.

FIGS. 3-5 depict various stages in the activation of an electronic coolant valve with a flexible seal in accordance with a preferred embodiment of the invention. In this embodiment, the electronic valve member 50 is positioned in an inlet channel or passageway 52 where it is used to regulate the flow of coolant from the inlet channel to the outlet channel 54. The lead screw 60 is positioned inside a flexible membrane 62 and attached to an electronic actuator (not shown), such as a BLDC motor. In this regard, the lead screw is inserted through a motor mount or retainer member 64.

A retainer fastener, such as a rivet 70 is positioned at the end of the threaded sleeve member 72 securing the sleeve member to the flexible membrane 62.

Anti-rotation guide members 80, 82 are also provided in the coolant valve in order to prevent the sleeve member 72 and flexible membrane 62 from rotating with the lead screw. These guide members can be the same as guide members 40, 42 discussed above and can operate in the same manner.

As mentioned above, FIGS. 3-5 show various stages of operation of an electronic cooling valve and the expansion and contraction of the flexible membrane. In FIG. 3, the flexible membrane 62 is extended longitudinally by rotation of the lead screw and movement of the sleeve member 72 in a vertically downward direction, thus opening the manifold channel 52 to full passage of coolant therethrough.

In contrast, in FIG. 5, the lead screw has pulled the sleeve member 72 in a vertical upward direction in the Figure, thus radially expanding the membrane 62 until it makes contact and seals against the inside surface of the inlet flow channel. This prevents flow of coolant through the manifold and into the outlet channel or passageway 54.

FIG. 4 shows a representative metered state of the electronic coolant valve. In this Figure, the lead screw has been rotated and the sleeve member 72 has been moved in the vertical direction in order to expand or contract the flexible membrane radially to a certain extent. In this metered state, the flow of coolant through the manifold from the inlet to the outlet is restricted. By regulating the vertical position of the sleeve member and the corresponding amount of expansion and/or contraction of the flexible membrane, as shown in FIG. 4, the flow of coolant through the manifold can be virtually infinitely adjusted.

Figure 6:
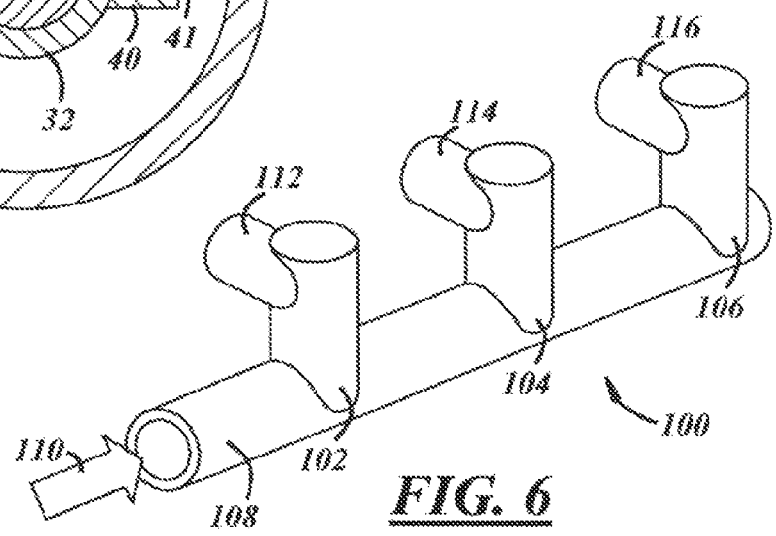
FIG. 6 illustrates another embodiment of the present invention utilizing multiple valves in a manifold.

Another embodiment of the invention is shown in FIG. 6 and referred to generally by the reference numeral 100. This embodiment attaches a plurality of electronic cooling valves 102, 104, 106 attached to a common manifold 108. The valves are preferably the same as the valves described above which have sealing members which meter the flow of fluid through a passageway. Coolant flow entering through inlet channel 110 is then separately metered or adjusted through a plurality of outlets 112, 114 and 116. Each of the electronic cooling valves 102, 104 and 106 has its own actuator member (not shown). Preferably the actuators consist of stepper motors or BLDC motors in the same manner as the embodiment shown in FIGS. 1-5. This embodiment allows the metering of coolant to multiple circuits.

Figure 7:
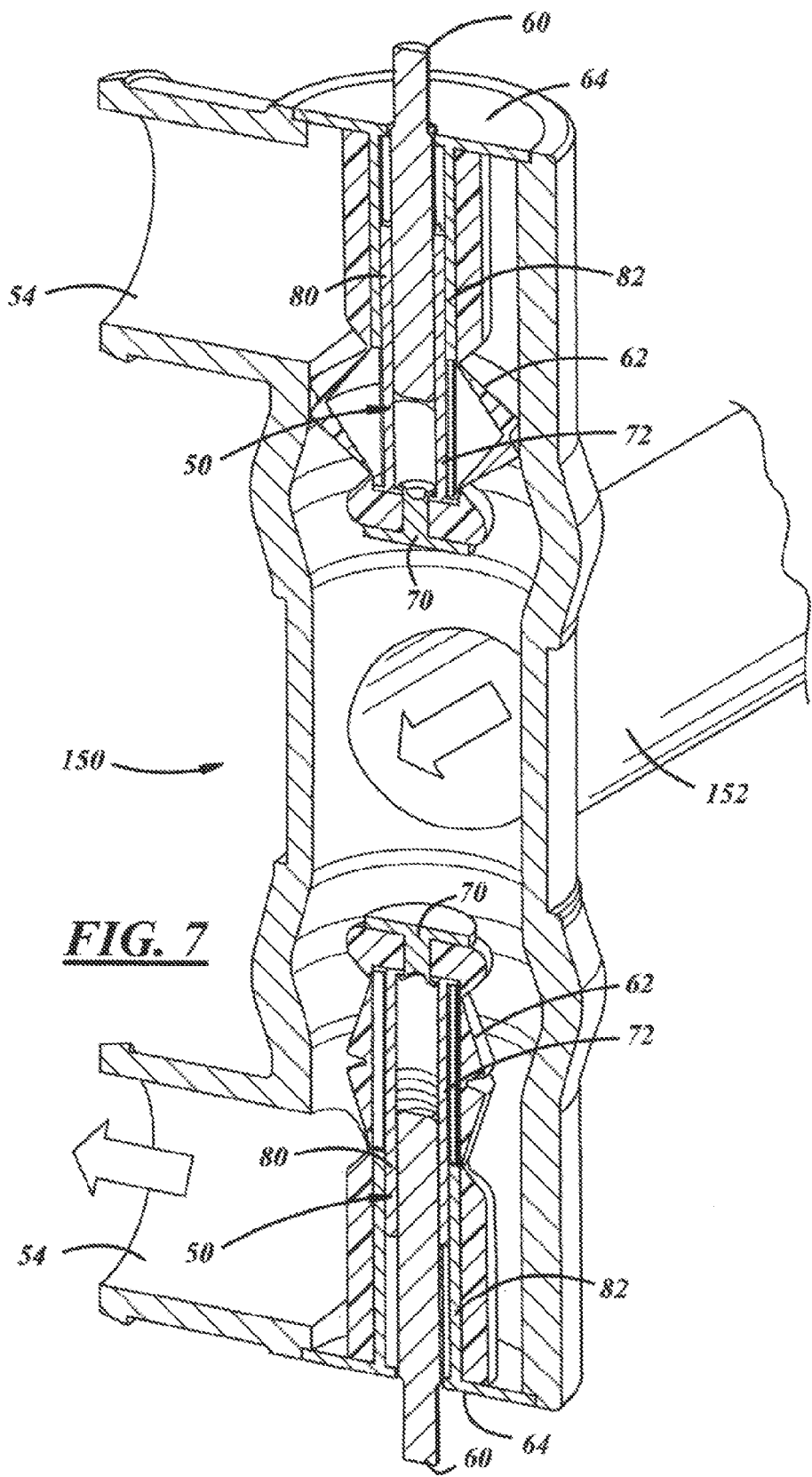
FIG. 7 illustrates still another embodiment of the present invention.

Another embodiment of the invention is shown in FIG. 7 and referred to generally by the reference numeral 150. In this embodiment, two opposing sealing members 50 are provided, each with a flexible sealing membrane 62. The housing or manifold inlet channel 152 is positioned between two opposing sealing members 50 and has an outlet at each end 54 downstream of the sealing sections. Each of the flexible membranes 62 can be extended or retracted by rotation of a lead screw 60 attached to an electric motor actuator of the type described above with reference to FIGS. 1-5.

The two flexible sealing members in the embodiment shown in FIG. 7 could act as a toggle and infinitely vary the two valves between their open and closed conditions. In this manner, when one section is in the fully closed state, the opposing section could be in the fully opened state and vice versa. The percentage of being opened and closed of each section could be varied infinitely and inversely with respect to each other.

Although the invention has been described with respect to preferred embodiments, it is to be also understood that it is not to be so limited since changes and modifications can be made therein which are within the full scope of this invention as detailed by the following claims.

What is claimed is:

1. A method of regulating the flow of fluid through a passageway comprising:
   positioning a flexible membrane member in said passageway;
   positioning a drive screw member inside said flexible membrane;
   said drive screw member being attached to said flexible member by a threaded sleeve member powered by the drive screw member and positioned at the distal end of said drive screw member, said threaded sleeve member being fixedly secured to said flexible membrane, and
   positioning at least one anti-rotation member connected to the threaded sleeve member for preventing rotation of said flexible membrane and the threaded sleeve member relative to said drive screw member;
   connecting an electric motor actuator to said drive screw member;
   actuating said electric motor to rotate said drive screw member around its longitudinal axis in order to effectuate radial expansion or contraction of said flexible membrane;
   rotation of said drive screw member in one direction moves said threaded sleeve member towards said electric motor and radially expands a mid-portion of said flexible membrane restricting flow of a fluid through said passageway, rotation of said drive screw member in the opposite direction retracts said mid-portion radially to a second position allowing flow of fluid through said passageway;
   wherein flow of fluid through a passageway can be metered.

2. An electronic coolant valve comprising:
   an electric motor;
   a drive screw member in operable association with said electric motor;
   a flexible membrane positioned around said drive screw;
   a threaded sleeve member powered by the drive screw member and positioned at the distal end of said drive screw member, said threaded sleeve member being fixedly secured to said flexible membrane; and
   at least one anti-rotation member connected to the threaded sleeve member for preventing rotation of said flexible membrane and said threaded sleeve member relative to said drive screw member
   wherein rotational movement of said drive screw by said electric motor can radially expand or retract the flexible membrane;
   wherein rotation of said drive screw member in one direction moves said threaded sleeve member towards said electric motor and expands said flexible sealing membrane by forcing a mid-portion of said membrane radially outwardly to move said valve in the closing direction; and
   wherein rotation of said drive screw member in the opposite direction moves said threaded sleeve member away from said electric motor and retracts said mid-portion of said membrane radially inwardly to move said valve in the opening direction.

3. The electronic coolant valve as described in claim 2 wherein rotation of said drive screw member by said electronic motor moves said sleeve member longitudinally in said valve.

4. The electronic coolant valve as described in claim 2 wherein said electric motor is a BLDC motor.

5. The electronic coolant valve as described in claim 2 wherein said electric motor is a stepper motor.

6. The electronic coolant valve as described in claim 2 wherein said flexible membrane is made of ethylene propylene diene monomer.

7. The electronic coolant valve as described in claim 2 wherein said flexible membrane is made of silicone.

* * * * *